Aug. 28, 1945.  N. E. BOUGHTON  2,383,587
CART FOR GOLF BAGS AND THE LIKE
Filed Nov. 29, 1943
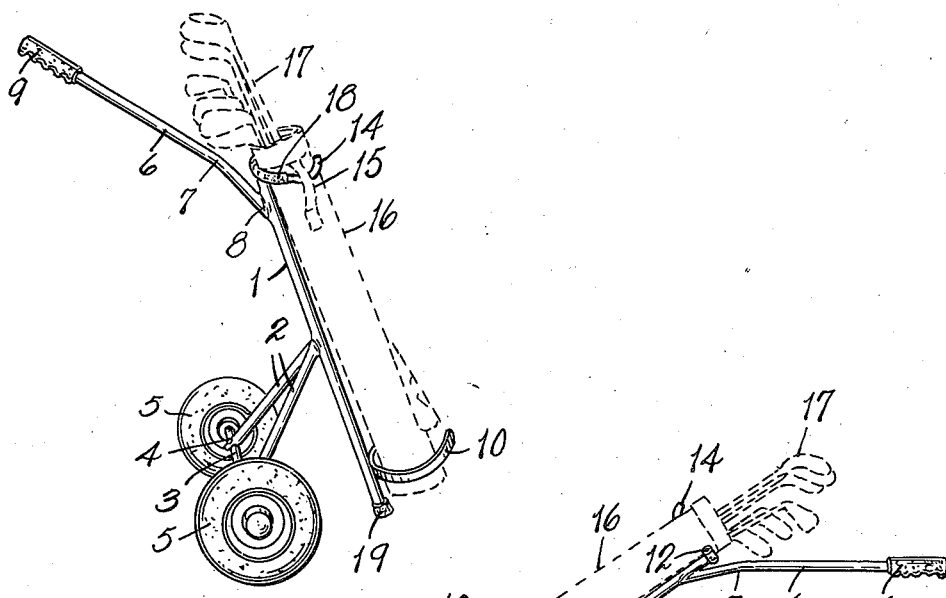
Fig. 1
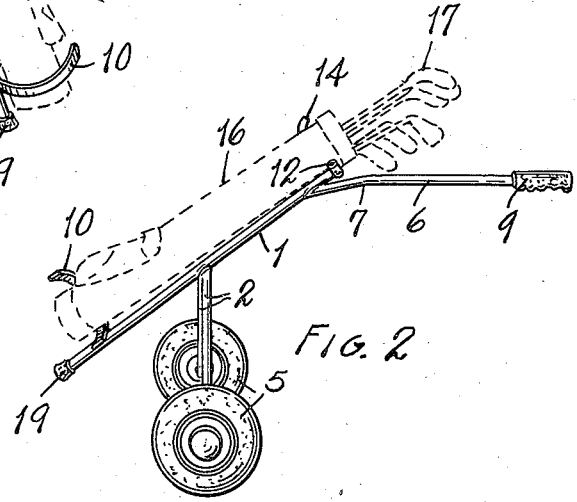
Fig. 2
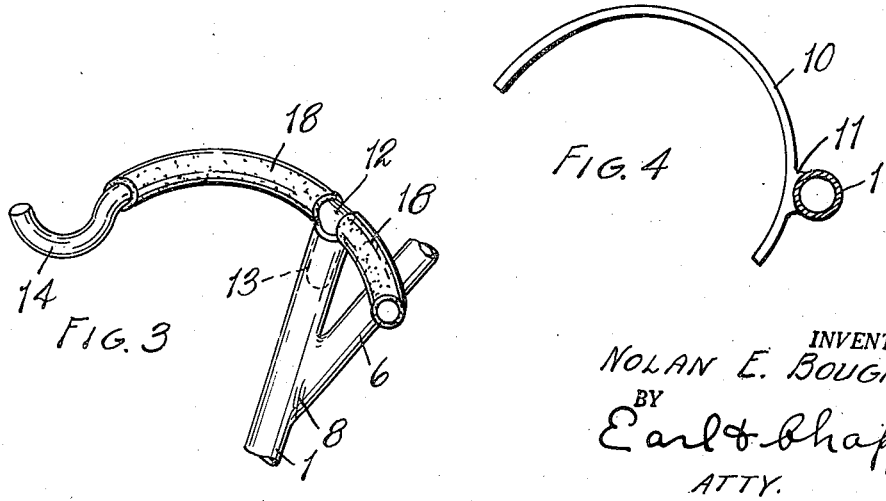
Fig. 3
Fig. 4
INVENTOR.
NOLAN E. BOUGHTON
BY
Earl & Chappell
ATTY.

Patented Aug. 28, 1945

2,383,587

UNITED STATES PATENT OFFICE 2,383,587

CART FOR GOLF BAGS AND THE LIKE

Nolan E. Boughton, Three Rivers, Mich.

Application November 29, 1943, Serial No. 512,199

8 Claims. (Cl. 280—53)

This invention relates to improvements in carts for golf bags and the like.

The main objects of this invention are:

First, to provide a cart for golf bags and the like which is light in weight and at the same time strong and durable, is easily trundled and may be conveniently carried.

Second, to provide a structure having these advantages in which the load when the cart is in trundling position is substantially balanced on the carrying wheels.

Third, to provide a structure having these advantages which, when in upright position, is stable and supports the golf bag in position for convenient access to the clubs.

Objects pertaining to details and economies of the invention will definitely appear from the description to follow. The invention is defined in the claims.

A structure which embodies the features of the invention is clearly illustrated in the accompanying drawing, in which:

Fig. 1 is a perspective view of a cart embodying the invention, a golf bag with clubs therein being illustrated in dotted lines as positioned on the cart.

Fig. 2 is a side elevation with the cart in trundling position.

Fig. 3 is an enlarged perspective view illustrating the top holder and the manner of mounting the same relative to the body and to the handle.

Fig. 4 is a transverse section illustrating the relation of the bottom holder to the body.

The embodiment of the invention illustrated comprises a body member 1 formed of a piece of tubing of a length approximating that of the average golf bag, preferably slightly longer. The wheel struts 2 are welded to the outer side of the body member to diverge downwardly relative to each other and in rearwardly inclined relation. The axle 3 is fixedly secured to the lower ends of the struts 2 by means of rivets or welding at 4 and constitutes a bracing cross piece for the struts. The wheels 5 are arranged on the axle at the outer sides of the struts. The handle 6 is preferable angled at 7 and welded to the under side of the body member at 8 in spaced relation to the upper end of the body member. The handle is provided with a grip 9.

A bottom holder member 10 is welded at 11 to the upper side of the body member. This holder member 10 is in the form of a curved arm and faces in a lateral direction. It will be noted that it is substantially offset to one side of the vertical plane of the body member. The top holder member 12 is provided with a stem 13 which is inserted in the upper end of the tubular body 1. This top holder member is also offset relative to the body member, that is, one arm is substantially longer than the other, the longer arm terminating in an upwardly facing hook 14 adapted to engage the handle 15 of a golf bag 16 arranged in the holder members. A set of golf clubs is indicated at 17.

This supporting of the golf bag mainly at one side of the body member positions the golf clubs in the bag to one side so that they do not interfere with the person trundling the cart, the assumption being that with the embodiment illustrated the cart will be trundled by the operator grasping the handle with his right hand, which would be the case with the average player. This positioning also enables the grasping of the body member when it is desired to carry the cart with the bag therein. It will be understood that on the average golf course some situations are encountered where trundling of the cart is not practical, and it is usually necessary to carry the cart from and into the buildings.

My improved cart is relatively light in weight, which is of advantage for the purposes indicated, and at the same time it is strong and rigid. The upper holder is preferably provided with tubular coverings 18 for the arms thereof, and these may be pieces of rubber tubing. The bottom holder member may be covered if desired but I do not find that necessary in commercial structures. The lower end of the body member is provided with a shoe or tip 19 and the parts are so proportioned that the bag is held in a suitable upright position to afford access to the golf clubs when the structure is in upright position as indicated in Fig. 1. The parts are so arranged that the cart with the loaded bag thereon is evenly balanced when the cart is in trundling position.

I have illustrated and described my invention in an embodiment which I have found very practical. I have not attempted to illustrate or describe certain modifications and adaptations which I contemplate as it is believed this disclosure will enable those skilled in the art to embody or adapt my invention as may be desired.

Having thus described my invention what I claim as new and desire to secure by Letters Patent is:

1. A cart for golf bags and the like comprising a tubular bar-like body member, downwardly diverging rearwardly inclined axle struts welded to the under side of said body member intermediate the ends thereof, an axle carried by said struts and provided with wheels disposed at the outer sides of the struts, said axle constituting a cross piece for the lower ends of the struts, a handle welded to the under side of the body member in spaced relation from the upper end thereof, said handle projecting upwardly and rearwardly from its welded connection with the body member and provided with a hand piece, a laterally facing curved arm-like bottom holder welded to the upper side of said body member adjacent to but substantially spaced from the lower end thereof, and a top holder provided with a stem engaged in the upper end of said body member and comprising oppositely extending curved arms, one of said arms being substantially longer than the other and terminating in an upwardly facing hook adapted to engage the handle of a golf bag arranged within the holders, said holders being disposed mainly on one side of the vertical plane of the body member whereby the golf bag is also disposed mainly on one side of said vertical plane.

2. A cart for golf bags and the like comprising a tubular bar-like body member, downwardly diverging rearwardly inclined axle struts welded to the under side of said body member intermediate the ends thereof, an axle carried by said struts and provided with wheels disposed at the outer sides of the struts, said axle constituting a cross piece for the lower ends of the struts, a handle welded to the under side of the body member in spaced relation from the upper end thereof, said handle projecting upwardly and rearwardly from its welded connection with the body member and provided with a hand piece, a curved bottom holder welded to the upper side of said body member, and a top holder provided with a stem engaged in the upper end of said body member and comprising oppositely extending curved arms, one of said arms terminating in an upwardly facing hook adapted to engage the handle of a golf bag arranged within the holders.

3. A cart for golf bags and the like comprising a tubular bar-like body member, downwardly diverging rearwardly inclined axle struts welded to the under side of said body member intermediate the ends thereof, an axle carried by said struts and provided with wheels disposed at the outer sides of the struts, said axle constituting a cross piece for the lower ends of the struts, a handle welded to the under side of the body member in spaced relation from the upper end thereof, said handle projecting upwardly and rearwardly from its welded connection with the body member and provided with a hand piece, a curved bottom holder welded to the upper side of said body member, and a top holder provided with a stem engaged in the upper end of said body member and comprising oppositely extending curved arms, one of said arms terminating in an upwardly facing hook adapted to engage the handle of a golf bag arranged within the holders, the struts and axle being positioned relative to the body member and said handle so that the load is substantially balanced on the axle when the cart is in position for trundling, the lower end of the body member constituting a ground engaging rest for supporting the loaded cart in upright position.

4. A cart for golf bags and the like comprising a bar-like body member, downwardly diverging rearwardly inclined axle struts secured to said body member intermediate the ends thereof, an axle carried by said struts, wheels on said axle, a handle secured to said body member adjacent the upper end thereof, a curved bottom holder secured to said body member adjacent the lower end thereof, and a curved top holder secured to said body member above said handle, said top holder being provided at one end with an upwardly facing hook adapted to be engaged with the handle of a golf bag arranged within the holders, said holders being disposed mainly on one side of the vertical plane of the body member whereby the golf bag is also disposed mainly on one side of said vertical plane, the struts and axle being positioned relative to the body member and handle so that the loaded cart is substantially balanced on the axle when the cart is in trundling position, the lower end of the body member constituting a ground engaging rest and coacting with the wheels in supporting the cart in an upright position.

5. A cart for golf bags and the like comprising a bar-like body member, downwardly diverging rearwardly inclined axle struts secured to said body member intermediate the ends thereof, an axle carried by said struts, wheels on said axle, a handle secured to said body member adjacent the upper end thereof, a bottom holder secured to said body member adjacent the lower end thereof, and a top holder secured to said body member at the upper end thereof, said top holder being provided with an upwardly facing hook adapted to be engaged with the handle of a golf bag arranged within the holders, the struts and axle being positioned relative to the body member and handle so that the loaded cart is substantially balanced on the axle when the cart is in trundling position, the lower end of the body member constituting a ground engaging rest and coacting with the wheels in supporting the cart in an upright position, said bottom holder being open at the bottom thereof to permit the golf bag being suspended therethrough, said upwardly facing hook suspendingly supporting the golf bag through the lower holder, said ground engaging rest projecting substantially below the lower holder to permit the bottom of the bag being suspendingly positioned above the ground, when the ground engaging rest is in ground engaging position.

6. A cart for golf bags and the like comprising a bar-like body member, downwardly diverging axle struts secured to said body member intermediate the ends thereof, an axle carried by said struts, wheels on said axle, a handle secured to said body member adjacent the upper end thereof, a bottom bag holder secured to said body member adjacent the lower end thereof, and a top bag holder member secured to said body member adjacent the top thereof and adapted to engage the handle of a golf bag arranged within the holders, said holders being disposed mainly on one side of the vertical plane of the body member whereby the golf bag is also disposed mainly on one side of said vertical plane, the struts and axle being positioned relative to the body member and handle so that the loaded cart is substantially balanced on the axle when the cart is in trundling position, the lower end of the body member constituting a ground engaging rest and coacting with the wheels in supporting the cart in an upright position, said bottom holder being open at the bottom thereof to permit the golf bag being suspended therethrough, said top holder suspendingly supporting the golf bag through the lower holder, said ground engaging rest projecting a substantial distance below the lower holder to permit the bottom of the golf bag being suspendingly positioned above the ground when the ground engaging rest is in ground engaging position.

7. A cart for golf bags and the like comprising a bar-like body member, downwardly diverging axle struts secured to said body member intermediate the ends thereof, an axle carried by said struts, wheels on said axle, a handle secured to said body member adjacent the upper end thereof, a bottom bag holder secured to said body member adjacent the lower end thereof, and a top bag holder secured to said body member at a substantial distance above said handle and adapted to engage the handle of a golf bag arranged within the holders, the struts and axle being positioned relative to the body member and handle so that the loaded cart is substantially balanced on the axle when the cart is in trundling position, the lower end of the body member constituting a ground engaging rest and coacting with the wheels in supporting the cart in an upright position.

8. In a carrier for golf bags, a wheeled carriage having a framework extending substantially generally vertically when the carriage is in a normal inoperative position, a handle secured to said framework adjacent the upper end thereof, a top holder secured to said framework adjacent the upper end thereof and adapted to engage the handle of a golf bag to suspendingly support the bag, a bottom bag holder secured to said framework adjacent the lower end thereof and adapted to hold the bag against lateral displacement, said bottom holder being open at the bottom thereof to permit the bag being suspended therethrough, said top holder suspendingly supporting the bag through said lower holder, a ground engaging rest projecting from the lower portion of said framework and adapted to support the wheeled carriage in a normal inoperative upright position, said ground engaging rest projecting a substantial distance below the lower holder to permit the bottom of the bag being suspendingly positioned above the ground, when the ground engaging rest is in ground engaging position.

NOLAN E. BOUGHTON.